United States Patent
Massaro et al.

(10) Patent No.: US 9,004,373 B2
(45) Date of Patent: Apr. 14, 2015

(54) ULTRASONIC WELDED HEADLIGHT WASHER ASSEMBLIES

(75) Inventors: Nick A. Massaro, Dublin, OH (US); Erich W. Bauer, Hilliard, OH (US)

(73) Assignee: Honda Motor Co., Ltd., Tokyo (JP)

( * ) Notice: Subject to any disclaimer, the term of this patent is extended or adjusted under 35 U.S.C. 154(b) by 190 days.

(21) Appl. No.: 13/540,832

(22) Filed: Jul. 3, 2012

(65) Prior Publication Data
US 2014/0008460 A1 Jan. 9, 2014

(51) Int. Cl.
  *B05B 17/00* (2006.01)
  *B05B 1/10* (2006.01)
  *B60S 1/52* (2006.01)
  *B60S 1/56* (2006.01)

(52) U.S. Cl.
  CPC .. *B60S 1/528* (2013.01); *B60S 1/56* (2013.01); *Y10T 29/49622* (2013.01)

(58) Field of Classification Search
  USPC ............ 239/284.1, 284.2, 570, 1, 288, 288.3, 239/289; 15/250.002; 180/313; 280/1
  See application file for complete search history.

(56) References Cited

U.S. PATENT DOCUMENTS

| | | | |
|---|---|---|---|
| 3,803,397 A | 4/1974 | Dick | |
| 4,912,606 A | 3/1990 | Yamamoto | |
| 6,520,659 B2 * | 2/2003 | Nishiyama et al. | 239/284.2 |
| 7,108,410 B2 | 9/2006 | Stidham et al. | |
| 7,182,276 B2 * | 2/2007 | Sakai et al. | 239/284.2 |
| 7,329,032 B2 | 2/2008 | Verwaerde et al. | |
| 7,699,244 B2 * | 4/2010 | Sakai et al. | 239/284.2 |
| 7,891,581 B2 * | 2/2011 | Keller et al. | 239/284.2 |
| 2009/0014555 A1 * | 1/2009 | Litvinov et al. | 239/284.2 |

* cited by examiner

*Primary Examiner* — Steven J Ganey
(74) *Attorney, Agent, or Firm* — Fay Sharpe LLP

(57) ABSTRACT

A headlight washer assembly includes a bracket secured to a rear surface of a component of a vehicle adjacent an opening therein through which a headlight washer device is configured to extend and retract. The bracket provides a recessed mounting surface for securing the headlight washer device to the component of the vehicle such that, unlike prior art approaches, the fasteners do not protrude from the front surface of the component of the vehicle. A cap concealing the opening in the component is received within the opening flush with the front surface of the component. In one embodiment, the component is a body panel of a vehicle.

19 Claims, 3 Drawing Sheets

ULTRASONIC WELDED HEADLIGHT WASHER ASSEMBLIES

BACKGROUND

The present exemplary embodiment relates to automobiles. It finds particular application in conjunction with a headlight washer assembly, and will be described with particular reference thereto. However, it is to be appreciated that the present exemplary embodiment is also amenable to other like applications.

Headlight washer arrangements are known that typically include a washer device mounted near a headlight of a vehicle for the purpose of spraying the lens of the headlight with water or with a cleaning mixture. For aesthetic purposes, and to provide protection from dirt and other contaminants, the headlight washer device is often received behind a bumper or bumper skin of the vehicle and is movable between two positions. In a first position, the washer device is retracted behind the front surface of the bumper. In a second position, the headlight washer device projects from the bumper beyond or about the front or top surface of the bumper through an opening provided therein, and a nozzle of the headlight washer device is directed towards the headlight lens for spraying the same with cleaning fluid.

In some arrangements, the washer device is mounted to the bumper via fasteners that extend through the front surface of the bumper. Such fasteners are typically located adjacent the opening in the bumper through which the washer device extends during operation.

When the washer device is not in use and, thus, in its first position retracted behind the front surface of the bumper, a bumper cap is typically provided to conceal the opening in the bumper and the fasteners that secure the washer device to the bumper. The bumper cap is typically mounted to a movable portion of the washer device such that, when the washer device is operated, the bumper cap moves with the washer device. Thus, when the washer device is in the first position, the bumper caps configured to cover the opening in the bumper and the fasteners adjacent the opening, and when the washer device is in the second position, the bumper cap is configured to be spaced apart from the front surface of the bumper such that the washer device can extend through the opening.

While such headlight washer assemblies provide suitable performance, the bumper cap generally must sit proud of the outer surface of the bumper to conceal the fasteners securing the washer device to the bumper. This creates an unsightly aberration of the bumper surface that is particularly noticeable in newer vehicles with sculpted bumpers or bumper skins. Moreover, the bumper cap is more susceptible to tampering and/or damage since it extends from the bumper's outer surface.

BRIEF DESCRIPTION

The present disclosure sets forth a headlight washer assembly including a bracket secured to a rear surface of a component of a vehicle adjacent an opening therein through which a headlight washer device is configured to extend and retract. The bracket provides a recessed mounting surface for securing the headlight washer device to the component of the vehicle such that, unlike prior art approaches, the fasteners do not protrude from the front surface of the component of the vehicle. A cap concealing the opening in the component is received within the opening flush with the front surface of the component. In one embodiment, the component is a body panel of a vehicle.

In accordance with one aspect, a vehicle comprises a plurality of body panels, at least one headlight, and a headlight washer assembly supported adjacent to said headlight. The at least one headlight assembly is supported on a bracket ultrasonically welded to an inner surface of a body panel adjacent an opening in said panel through which a telescoping member of the headlight washer assembly having a nozzle is configured to extend, the telescoping member being extendable through the opening between a first position where the nozzle is located behind an outer surface of the body panel and a second position where the nozzle is located in front of the body panel for dispensing cleaning fluid on the adjacent headlight, and wherein a headlight washer cap is operatively connected to the telescoping member and supported in the opening in the body panel such that an exterior surface thereof is flush with the outer surface of the body panel when the telescoping member is in the first position.

The bracket can include a mounting surface spaced from the inner surface of the body panel, and the headlight washer assembly can be mounted to the mounting surface of the bracket in spaced relation to the body panel. The headlight washer cap can engage a surface of the bracket when the telescoping member is in the first position. The cap can be supported by a surface of the bracket. The headlight washer assembly can be secured to the bracket with a fastener. The opening in the body panel can have at least four sides. The bracket can be secured to the body panel at opposing sides of the opening, such as above and below the opening.

In accordance with another aspect, a component for a vehicle including a headlight washer assembly comprises a component body having an outer surface and an inner surface opposite the outer surface, an opening in the component body extending between the outer surface and the inner surface, a bracket ultrasonically welded to the inner surface of the component body for supporting a headlight washer assembly, and a headlight washer assembly mounted to the bracket. The headlight washer assembly includes a telescoping member having a nozzle, the telescoping member extendable through the opening in the component body between a first position where the nozzle is located behind the component outer surface and a second position where the nozzle is located in front of the component for dispensing cleaning fluid on an adjacent headlight, and a headlight washer cap operatively connected to the telescoping member, the headlight washer cap being supported in the opening in the component body such that an exterior surface thereof is flush with the outer surface of the component when the telescoping member is in the first position.

The bracket can include a mounting surface spaced from the inner surface of the component body, and the headlight washer assembly can be mounted to the mounting surface of the bracket in spaced relation to the component body. The headlight washer cap can engage a surface of the bracket when the telescoping member is in the first position, and can be supported by a surface of the bracket. The headlight washer assembly can be secured to the bracket with a fastener. The opening in the component body can have at least four sides. The bracket can be secured to the component body at opposing sides of the opening, such as above and below the opening.

In accordance with another aspect, a method of mounting a headlight washer assembly to a component of a vehicle comprises ultrasonically welding a bracket to an inner surface of a component body adjacent an opening in said component body, the bracket including a mounting surface spaced from the inner surface of the component body, securing a headlight washer device to the bracket, the headlight washer assembly including a telescoping member having a nozzle, the telescoping member extendable through the opening in the component body between a first position where the nozzle is located behind an outer surface of the component body and a second position where the nozzle is located in front of the component body for dispensing cleaning fluid on an adjacent headlight, and mounting a headlight washer cap to the telescoping member of the headlight washer device, the headlight washer cap being supported in the opening in the component body such that an exterior surface thereof is flush with the outer surface of the component when the telescoping member is in the first position.

DETAILED DESCRIPTION

Figure 1:
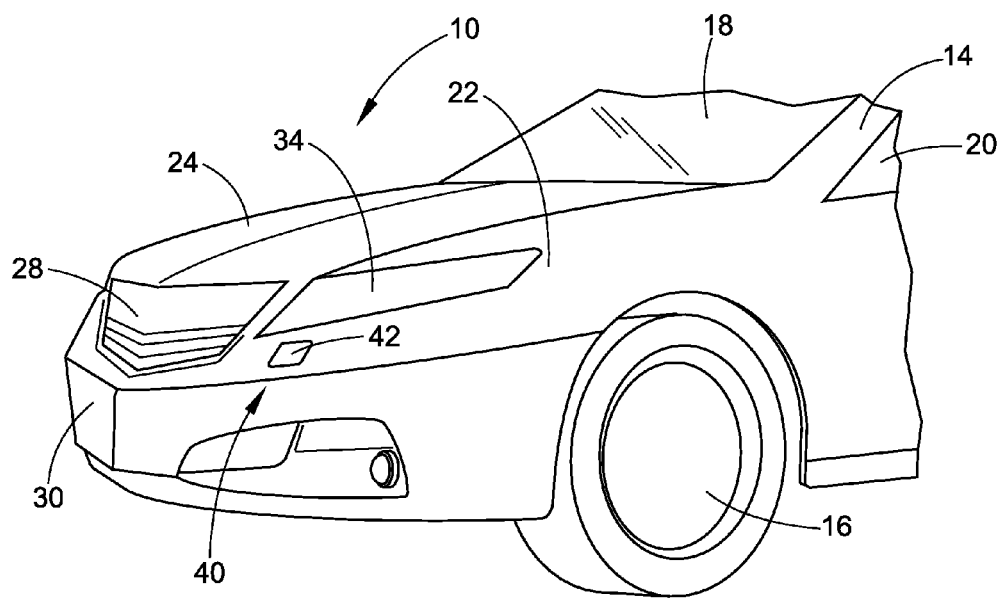
FIG. 1 is a perspective view of an exemplary vehicle having a headlight washer assembly (stowed) in accordance with the disclosure.

With reference to FIG. 1, an exemplary vehicle 10 is illustrated. The vehicle 10 in this embodiment is a passenger vehicle, but aspects of this disclosure are applicable to a wide variety of vehicle types. The vehicle 10 includes a vehicle body 14 supported on a frame (not shown) and a plurality of wheels 16 which support the frame and body 14 for movement over the ground. The body 14 of the vehicle 10 generally includes a windshield 18, one or more side windows 20, a front fender portion 22, a hood portion 24, a front grill 28 and a bumper 30. As will be appreciated, the components listed are merely exemplary and are illustrative of a typical passenger vehicle, but the type of vehicle is not necessarily germane.

In the exemplary vehicle 10 of FIG. 1, the bumper 30 may in fact be a bumper skin or layer of material that shrouds the actual functional bumper of the vehicle. As is common in newer cars, a bumper skin integrated into the front forward facing portion of the vehicle conceals the functional bumper and provides an aesthetic surface. Thus, although the term bumper is used in this disclosure, it will be appreciated that the term bumper simply is intended to refer to a forward portion of the vehicle and can include bumper skins, fenders, grills, hoods etc., and it will be understood that aspects of this disclosure are not limited to any particular type of vehicle component.

Mounted within the front fenders of the vehicle 10 are a pair of headlights 34 that contain light producing elements for enabling operation of the vehicle in the dark. As will be appreciated, a wide variety of headlights and headlight configurations are known and aspects of the invention are equally applicable to other headlights/configurations in addition to that shown in the Figures. Below each headlamp 34 is a headlight washer assembly 40. The headlight washer assembly 40 could also be mounted above or to the side of the headlight, as desired, and aspects of the disclosure are equally applicable to such arrangements.

Figure 2:
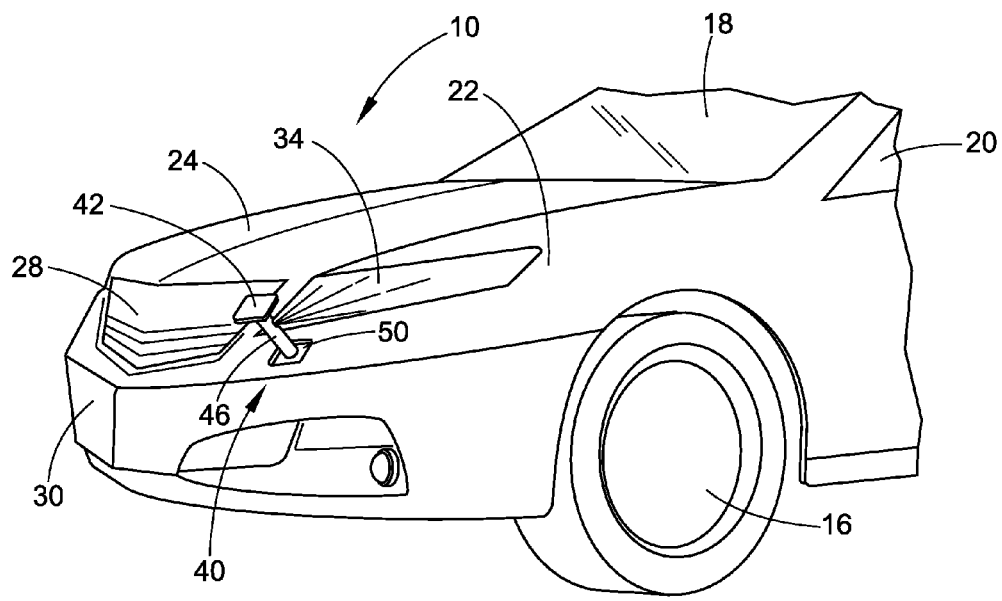
FIG. 2 is a perspective view of the vehicle of FIG. 1 with the headlight washer assembly in an extended position.

The illustrated washer assembly 40 is a telescoping washer assembly that is movable between a stowed position, shown in FIG. 1, to a deployed position shown in FIG. 2, for dispensing a cleaning fluid on a lens of the headlight 34. Other types of washer assemblies exist and can also be used in accordance with the disclosure.

In FIG. 1, the headlight washer assembly 40 is not visible, as it is concealed behind the front portion of the vehicle, i.e., the front fender 22 and/or bumper 30, and a headlight washer cap 42 conceals the hole in the front surface of the vehicle through which the headlight washer is configured to extend when it is moved to the position of FIG. 2. As noted, it is often desirable to conceal headlight washer assemblies to protect the same from dust and debris, and to improve the appearance of the vehicle.

Referring now to FIG. 2, the washer assembly is shown in a deployed position with a telescoping portion 46 of the headlight washer assembly 40 extending through hole 50 in the front surface of the vehicle to position a nozzle 52 in spaced apart relation from the front surface of the vehicle and/or headlight 34. In this position, the nozzle is situated to direct a spray of cleaning solution at a surface of the headlight 34. The washer cap 42 is displaced from its position in FIG. 1 to the position in FIG. 2 since it is attached to the telescoping portion 46 of the headlight washer assembly 40. As will be appreciated, since the washer cap 42 moves with the telescoping portion 46, the hole 50 is automatically opened/uncovered upon activation of the headlight washer assembly.

Figure 3:
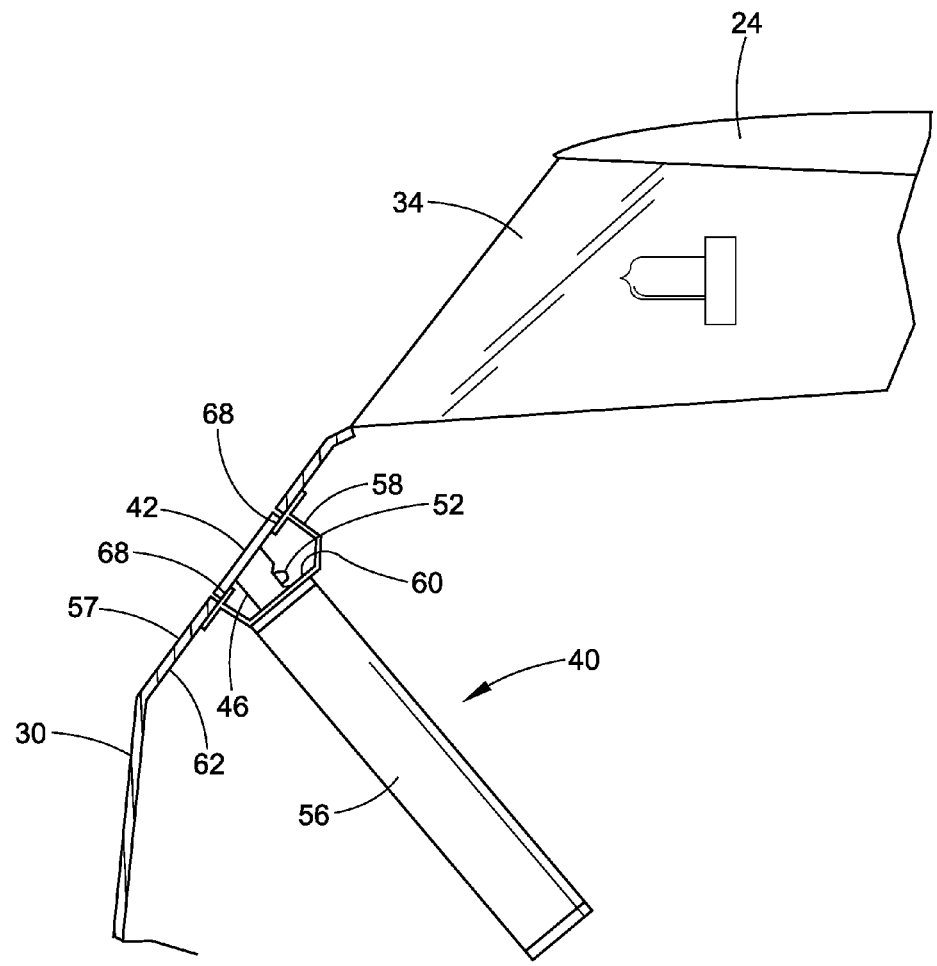
FIG. 3 is a partial cross-sectional view taken through the bumper of the automobile of FIGS. 1 and 2 illustrating the headlight washer assembly in a retracted position (stowed)
Figure 4:
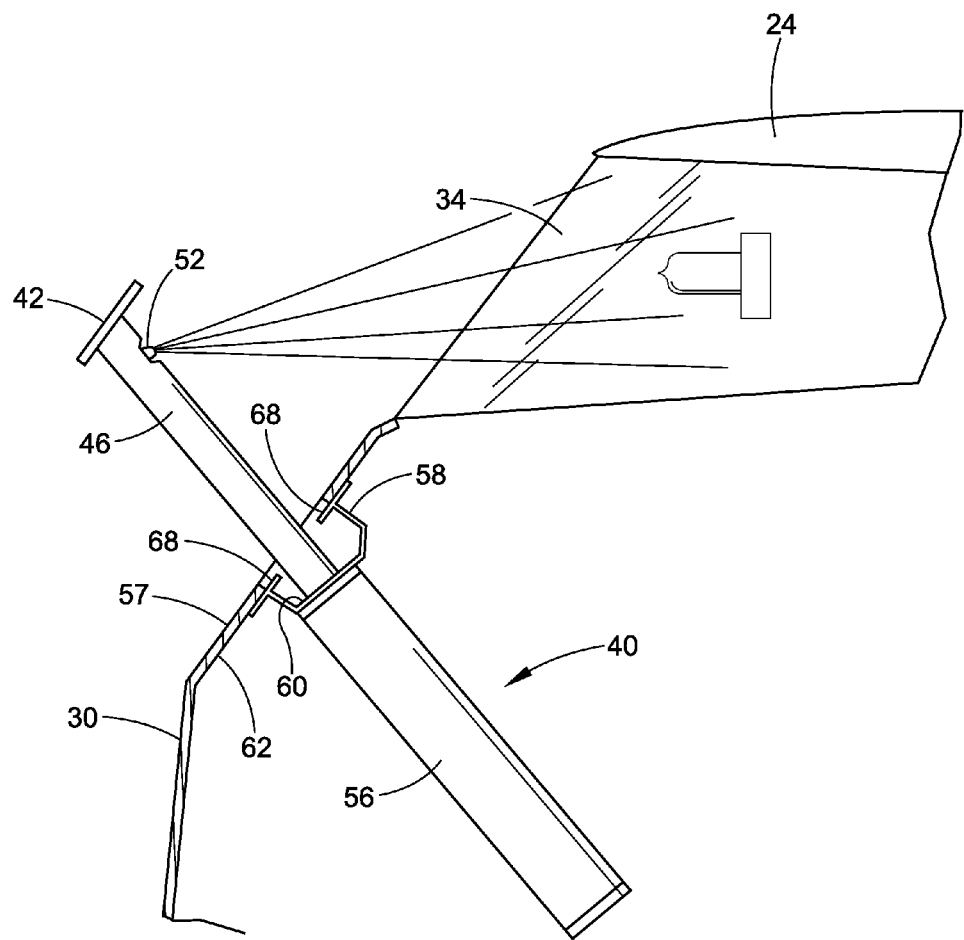
FIG. 4 is a partial cross-sectional view similar to that of FIG. 3 but with the headlight washer assembly in an extended (operative) position.

Turning to FIGS. 3 and 4, the details of the headlight washer assembly 40 are illustrated. In the illustrated embodiment, the headlight washer assembly 40 is generally a cylindrical unit having a body 56 supporting the telescoping portion 46 for movement between the stowed position of FIG. 3 to the extended position of FIG. 4. In accordance with the disclosure, the body 56 is mounted to the vehicle such that the cap 42 is flush with the outer surface 57 of the front portion of the vehicle 10 when the headlight washer assembly 40 is in the stowed position as shown in FIG. 3.

Although any type of headlight washer unit can be used with aspects of this disclosure, the exemplary assembly includes a cylindrical housing, body 56, having an inlet port (not shown) for receiving pressurized cleaning fluid from a pump, and a telescoping portion 46 mounted on a piston (not shown) which is slidably mounted within the body 56. The nozzle 52 is mounted on a distal end of the telescoping portion 46 which projects from the body 56. The telescoping portion 46 is normally held in the retracted (stowed) position within the body 56 by a return spring. When washing fluid is introduced into the body 56 through the inlet port, the pressure of the fluid forces the piston against the return force of the return spring into an operative position in which the telescoping portion 46 projects from the body 56. Thus, the nozzle 52 is moved from an inoperative position to an operative position. Accordingly, the nozzle 52 does not normally obstruct the headlight and is not normally visibly from an exterior of the vehicle, but is located in a position of optimum washing efficiency when in use.

The telescoping portion 46 is an elongate tube through which cleaning fluid can flow to the nozzle 52 for dispensing. When the supply of cleaning fluid is activated, it is desirable that fluid flow through the nozzle 52 is restricted until the washer assembly is fully in its extended operative position. To ensure this effect, a valve is typically provided that is operative to enable cleaning fluid to flow to the nozzle 52 only after the telescoping portion 46 is fully extended. Conversely, the valve closes before the telescoping portion 46 begins to retract. Again, the details of the washer assembly are not necessarily germane to this disclosure and, thus, the preceding description is merely exemplary in nature.

To achieve the flush fit of the cap 42 with the outer surface 57 of the front portion of the vehicle, a bracket 58 is ultrasonically welded to the inner surface of the front portion of the vehicle and provides a recessed mounting surface 60 for mounting of the body 56. The body 56 can be secured to the bracket 58 using any suitable fasteners such as bolts, screws or the like (not shown). These fasteners can pass through the recessed mounting surface 60 and engage corresponding threaded bores, for example, provided in the body 56. The outer surface is generally identified by reference numeral 57, and the inner surface of the bumper 30 is identified by reference numeral 62.

As will be appreciated, the ultrasonically welded bracket 58 provides a mounting surface that is spaced from the inner surface 62 of the forward portion of the car, in this case bumper 42, allowing the washer assembly 40 to be mounted in spaced relation to the front surface of the vehicle. This allows the headlight washer cap 42 to be flush with the front surface 57 of the vehicle and engage tabs 68 of the bracket 58 when the telescoping member 46 is in the retracted position shown in FIG. 3, for example. Thus, the bracket 58 can serve to support the peripheral edges of the cap 42 thereby ensuring a flush fit.

In the illustrated embodiment, the hole 50 has four sides and is generally a square shape, but of course, any desirable size or shape of hole could be used. The bracket is ultrasonically welded to opposing sides of the hole 50, in this case above and below the hole.

Although the exemplary embodiment relates to a bumper mount headlight washer assembly, it will be appreciated that the headlight washer assembly could be mounted to virtually any component of a vehicle, including a frame component, a body component such as a hood, fender, bumper skin, etc.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

The invention claimed is:

1. A vehicle comprising:
   a plurality of body panels;
   at least one headlight; and
   a headlight washer assembly supported adjacent to said headlight;
   wherein the headlight washer assembly is supported on a bracket ultrasonically welded to an inner surface of a body panel adjacent an opening in said panel through which a telescoping member of the headlight washer assembly having a nozzle is configured to extend, the telescoping member being extendable through the opening between a first position where the nozzle is located behind an outer surface of the body panel and a second position where the nozzle is located in front of the body panel for dispensing cleaning fluid on the adjacent headlight, and wherein a headlight washer cap is operatively connected to the telescoping member and supported in the opening in the body panel such that an exterior surface thereof is flush with the outer surface of the body panel when the telescoping member is in the first position.

2. A vehicle as set forth in claim 1, wherein the bracket includes a mounting surface spaced from the inner surface of the body panel, and wherein the headlight washer assembly is mounted to the mounting surface of the bracket in spaced relation to the body panel.

3. A vehicle as set forth in claim 1, wherein the headlight washer cap engages a surface of the bracket when the telescoping member is in the first position.

4. A vehicle as set forth in claim 1, wherein the cap is supported by a surface of the bracket.

5. A vehicle as set forth in claim 1, wherein the headlight washer assembly is secured to the bracket with a fastener.

6. A vehicle as set forth in claim 1, wherein the opening in the body panel has at least four sides.

7. A vehicle as set forth in claim 1, wherein the bracket is secured to the body panel at opposing sides of the opening.

8. A vehicle as set forth in claim 7, wherein the bracket is secured to the body panel above and below the opening.

9. A vehicle as set forth in claim 1, wherein the body panel includes at least one of a bumper, a bumper skin, a fender, and a hood.

10. A component for a vehicle including a headlight washer assembly comprising:
    a component body having an outer surface and an inner surface opposite the outer surface;
    an opening in the component body extending between the outer surface and the inner surface;
    a bracket ultrasonically welded to the inner surface of the component body adjacent the opening for supporting a headlight washer assembly; and
    a headlight washer assembly mounted to the bracket, wherein the headlight washer assembly includes a telescoping member having a nozzle, the telescoping member extendable through the opening in the component body between a first position where the nozzle is located behind the component outer surface and a second position where the nozzle is located in front of the component for dispensing cleaning fluid on an adjacent headlight, and a headlight washer cap operatively connected to the telescoping member, the headlight washer cap being supported in the opening in the component body such that an exterior surface thereof is flush with the outer surface of the component when the telescoping member is in the first position.

11. A component for a vehicle as set forth in claim 10, wherein the bracket includes a mounting surface spaced from the inner surface of the component body, and wherein the headlight washer assembly is mounted to the mounting surface of the bracket in spaced relation to the component body.

12. A component for a vehicle as set forth in claim 10, wherein the headlight washer cap engages a surface of the bracket when the telescoping member is in the first position.

13. A component for a vehicle as set forth in claim 10, wherein the cap is supported by a surface of the bracket.

14. A component for a vehicle as set forth in claim 10, wherein the headlight washer assembly is secured to the bracket with a fastener.

15. A component for a vehicle as set forth in claim 10, wherein the opening in the component body has at least four sides.

16. A component for a vehicle as set forth in claim 15, wherein the bracket is secured to the component body at opposing sides of the opening.

17. A component for a vehicle as set forth in claim 16, wherein the bracket is secured to the component body above and below the opening.

18. A component for a vehicle as set forth in claim 10, wherein the component includes at least one of a bumper, a bumper skin, a fender, and a hood.

19. A method of mounting a headlight washer assembly to a component of a vehicle comprising:

ultrasonically welding a bracket to an inner surface of a component body adjacent an opening in said component body, the bracket including a mounting surface spaced from the inner surface of the component body;

securing a headlight washer device to the bracket, the headlight washer assembly including a telescoping member having a nozzle, the telescoping member extendable through the opening in the component body between a first position where the nozzle is located behind an outer surface of the component body and a second position where the nozzle is located in front of the component body for dispensing cleaning fluid on an adjacent headlight; and mounting a headlight washer cap to the telescoping member of the headlight washer device, the headlight washer cap being supported in the opening in the component body such that an exterior surface thereof is flush with the outer surface of the component when the telescoping member is in the first position.

* * * * *